US011763239B1

(12) United States Patent
Di Prinzio et al.

(10) Patent No.: US 11,763,239 B1
(45) Date of Patent: Sep. 19, 2023

(54) EMOTIONAL INTELLIGENCE ASSISTANT

(71) Applicant: Wells Fargo Bank, N.A., San Francisco, CA (US)

(72) Inventors: Matthew Mark Di Prinzio, St. Louis, MO (US); Matthew Aaron Fick, Shrewsbury, MO (US); Mary E. Huxhold, Kirkwood, MO (US); Faith Maria Lane, St. Louis, MO (US); Matthew Fitzroy Lynch, Swansea, IL (US); Nicholas Kent Pieri, Worden, IL (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1204 days.

(21) Appl. No.: 16/134,429

(22) Filed: Sep. 18, 2018

(51) Int. Cl.
*G06Q 10/0639* (2023.01)
*G06Q 30/016* (2023.01)
*G10L 25/63* (2013.01)
*G06V 40/16* (2022.01)

(52) U.S. Cl.
CPC ....... *G06Q 10/0639* (2013.01); *G06Q 30/016* (2013.01); *G06V 40/174* (2022.01); *G10L 25/63* (2013.01)

(58) Field of Classification Search
CPC ............ G06Q 10/0639; G06Q 30/016; G06V 40/174; G10L 25/63
See application file for complete search history.

(56) References Cited

U.S. PATENT DOCUMENTS

| 6,349,290 | B1 | 2/2002 | Horowitz et al. |
| 6,785,649 | B1 * | 8/2004 | Hoory ..................... G10L 13/08 704/235 |
| 9,648,171 | B1 | 5/2017 | Eftekhari et al. |
| 9,710,814 | B2 | 7/2017 | Gorny |
| 10,293,260 | B1 * | 5/2019 | Evans ................... A63F 13/424 |
| 10,735,592 | B1 * | 8/2020 | Liu ......................... G10L 15/26 |
| 10,896,428 | B1 * | 1/2021 | Balasubramaniam ...................... G10L 15/1815 |
| 2008/0270123 | A1 * | 10/2008 | Levanon ................. G10L 17/26 704/E11.002 |
| 2009/0234774 | A1 | 9/2009 | Segal et al. |
| 2011/0055674 | A1 * | 3/2011 | Sakai .................... G06F 40/169 715/200 |
| 2013/0019173 | A1 * | 1/2013 | Kotler ................. G06F 3/04883 715/834 |

(Continued)

FOREIGN PATENT DOCUMENTS

WO    WO-2017112496 A1    6/2017

*Primary Examiner* — Justin R. Blaufeld
(74) *Attorney, Agent, or Firm* — SCHWEGMAN LUNDBERG & WOESSNER, P.A.

(57) ABSTRACT

A system and related method are provided to receive user streaming interaction data (USID) and determine a context of the interaction. Processed stream data is stored, and emotion information (EI) is created by analyzing the processed stream data, producing an EI-tagged interaction record. An overall first EI value (EIV) reflects a value of an EI at a first time, and an overall second EIV reflects a value of an EI at a second time. Indicators related to the EIs are provided on a device of a service representative (SR). When the second EIV is more negative than the first EIV, the system communicates a recommended action to the service representative that is dependent upon on the context of the interaction and the EI.

16 Claims, 5 Drawing Sheets

(56) References Cited

U.S. PATENT DOCUMENTS

| | | | |
|---|---|---|---|
| 2013/0044042 A1* | 2/2013 | Olsson | G02B 27/0172 |
| | | | 345/8 |
| 2014/0039975 A1 | 2/2014 | Hill | |
| 2014/0287387 A1 | 9/2014 | Vukasinovic et al. | |
| 2014/0363059 A1* | 12/2014 | Hurewitz | G06Q 30/0201 |
| | | | 382/118 |
| 2015/0142446 A1 | 5/2015 | Gopinathan et al. | |
| 2016/0217807 A1* | 7/2016 | Gainsboro | H04M 3/568 |
| 2017/0148073 A1 | 5/2017 | Nomula et al. | |
| 2017/0310820 A1 | 10/2017 | Kao et al. | |
| 2017/0364484 A1* | 12/2017 | Hayes | G06F 40/109 |
| 2018/0025743 A1* | 1/2018 | Childress | G10L 15/26 |
| | | | 704/205 |
| 2018/0183929 A1* | 6/2018 | Fang | H04M 3/5166 |
| 2018/0268439 A1* | 9/2018 | Avegliano | G06V 40/174 |
| 2019/0042854 A1* | 2/2019 | Sanjay | G06V 20/52 |
| 2019/0121851 A1* | 4/2019 | Shires | H04N 7/15 |
| 2019/0130910 A1* | 5/2019 | Kariya | G10L 15/22 |
| 2019/0373336 A1* | 12/2019 | Kim | H04N 21/233 |
| 2020/0312351 A1* | 10/2020 | Takahashi | G06F 3/167 |

\* cited by examiner

EMOTIONAL INTELLIGENCE ASSISTANT

TECHNICAL FIELD

Described herein is a computer-based system, and more particularly, but without limitation, a system and method for detecting and utilizing emotions of a user in real time by way of an emotional intelligence assistant.

BACKGROUND

There is considerable variance in peoples' ability to determine the emotions of others in an interaction, and even when such emotion is properly determined, it may be difficult to know a correct response in any given context.

SUMMARY

Disclosed herein is a computer-implemented method for operating an emotional intelligence assistant of a service provider system comprising, during a contiguous interaction between a user and a service representative, using a processor receiving user streaming interaction data (USID), determining a context of the interaction that is related to a subject of the interaction, processing the USID by a communication processing engine to produce processed stream data that is stored in an interaction record in a user database, creating emotion information (EI) by analyzing, with an emotion tracking engine, the processed stream data, and associating the EI with the processed stream data to produce and store an EI-tagged interaction record.

The EI comprises: first EI that includes an overall first EI value (EIV) that reflects a positive-negative scale value of the first EI, the first EI being related to first USID captured at a first time; and second EI that includes an overall second EIV that reflects a positive-negative scale value of the second EI. The second EI is related to second USID captured at a second time that is later than the first time, wherein the overall second EIV is different from the overall first EIV.

The method further comprises producing, on a device of the service representative, a first indicator related to the first EI and a second indicator related to the second EI, wherein the second indicator differs from the first indicator, and using a strategy engine to, when the second EIV is more negative than the first EIV, communicate a recommended action, retrieved from a strategy database, to the service representative that is dependent upon on the context of the interaction and the EI.

Disclosed herein is also a system comprising a hardware processor, a non-volatile memory-based storage device connected to the hardware processor comprising instructions. The instructions, when executed on the processor, configure the processor to receive USID, determine a context of the interaction that is related to a subject of the interaction, process the USID by a communication processing engine to produce processed stream data that is stored in an interaction record in a user database, create EI by analyzing, with an emotion tracking engine, the processed stream data, and associating the EI with the processed stream data to produce and store an EI-tagged interaction record. The EI comprises: first EI that includes an overall first EIV that reflects a positive-negative scale value of the first EI, the first EI being related to first USID captured at a first time; and second EI that includes an overall second EIV that reflects a positive-negative scale value of the second EI, the second EI being related to second USID captured at a second time that is later than the first time, wherein the overall second EIV is different from the overall first EIV.

The processor is further configured to produce, on a device of the service representative, a first indicator related to the first EI and a second indicator related to the second EI, wherein the second indicator differs from the first indicator, and utilize a strategy engine to, when the second EIV is more negative than the first EIV, communicate a recommended action, retrieved from a strategy database, to the service representative that is dependent upon on the context of the interaction and the EI.

Disclosed herein is also a non-transitory computer-readable storage medium, the computer-readable storage medium including instructions that when executed by a processor, cause the processor to execute the method described above.

BRIEF DESCRIPTION OF THE DRAWINGS

In the drawings, which are not necessarily drawn to scale, like numerals may describe similar components in different views. Like numerals having different letter or numeric suffixes may represent different instances of similar components. The drawings illustrate generally, by way of example, but not by way of limitation, various embodiments discussed in the present document.

DETAILED DESCRIPTION

In-person interactions or in some cases even technology-assisted interactions may be personal and intimate-however, technology may act as a separating element that may serve to distance people from the interaction that they are a part of. The tool described herein may operate to create an emotional coaching platform for a service representative in real time communication with a user and allow for the performance of trend analysis in real-time or after the interaction. The tool may help increase a service representative's emotional intelligence quotient and improve interactions with the user.

Some implementations of the system described herein utilize an emotional intelligence assistance to that analyzes the emotional response of a user throughout an interaction such as a conversation with a service representative and provide real-time feedback. If the system detects stress, unhappiness, or dissatisfaction during the interaction, the service representative may employ a recommended action from a database to help improve the communications. The database may be based on historical data obtained from prior conversations with others. This tool may enhance a service representative's ability to better detect the emotions of a user while involved in an interaction with the user and allow the service representative to implement emotion enhancing actions in a given context that may have been historically successful.

The system may use a virtual- or augmented- (mixed-) reality agent to communicate information between a service representative and user to incorporate real-time emotional analysis and feedback. In order to measure the emotions of the user, the system may take advantage of wearable elements and other sensors. The system may base emotional feedback on the user's heart rate, word choice, voice tone, body language (e.g., arms crossed), facial expressions, etc. It may employ an emotion detection engine that takes all of these as input and provides EI feedback to the service representative. The system may utilize virtual reality or augmented reality and may utilize dynamic switching based on the user's mood. Graphic illustrations may be presented to the advisor to indicate the user's mood. This feedback may be based on the service representative's information style or preferred input. Additionally, the service representative may be presented to the user as having a nice office, impressive view/context, etc., even though the advisor's office may, in reality, be less impressive. The system may also use a matching algorithm to match the user to the right advisor-based on communication style or an emotional response. In one implementation, the interaction may take place in a completely virtual reality setting. In such a situation, an avatar of the SR 30 may be chosen that helps to maximize the EIV of the user 10.

Figure 1:
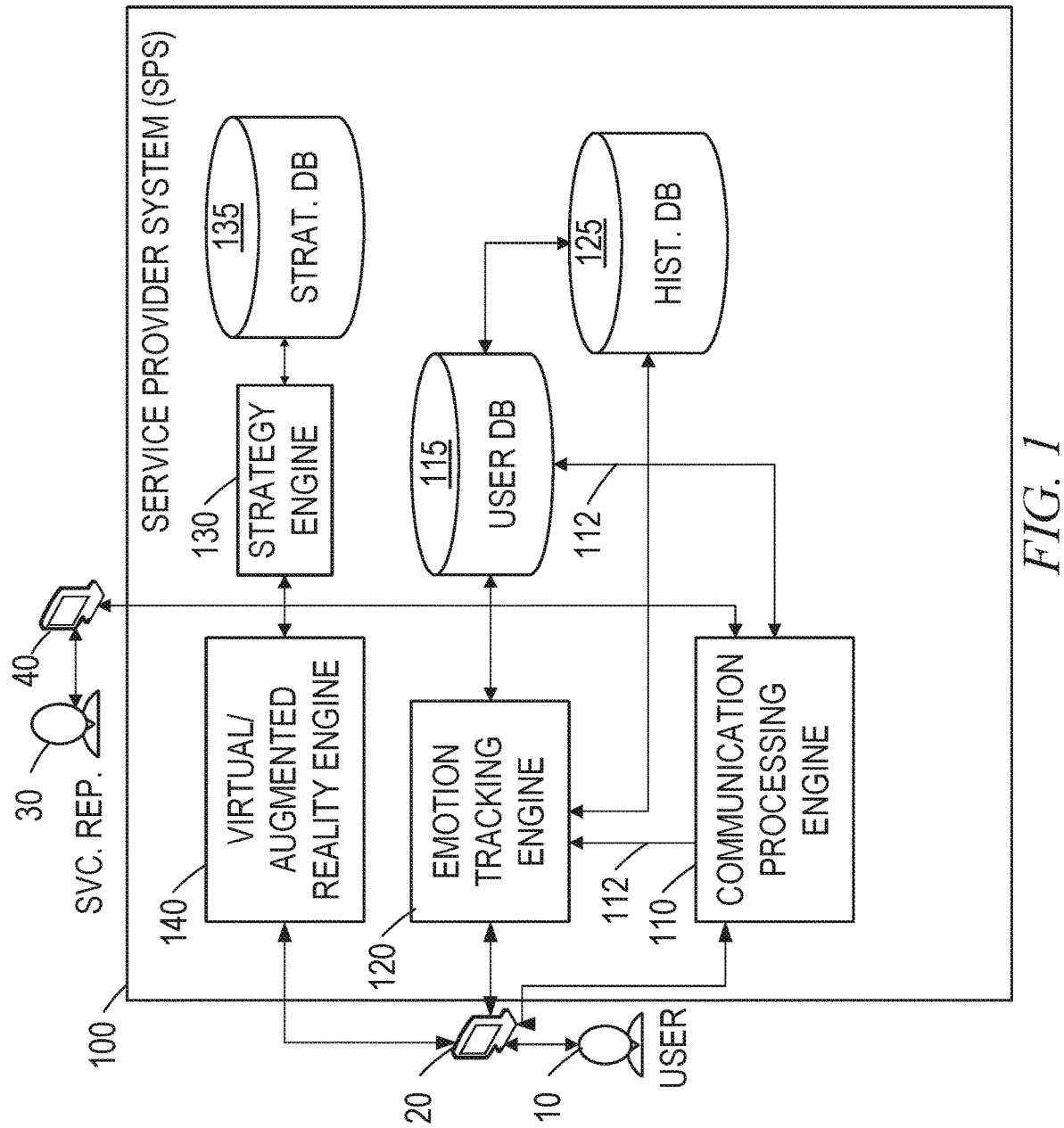
FIG. 1 is a block diagram illustrating an example of an emotional intelligence assistant, as described herein.

FIG. 1 is a block diagram illustrating an example of an emotional intelligence assistant (EIA) system 100. Although an implementation is described herein of a financial service provider utilizing such an EIA system 100, this is by way of example only, and the EIA system 100 may be used in a wide range of contexts in which greater emotional intelligence when interacting with another person may be beneficial.

In this example, a user 10 has an interaction with a service representative (SR) 30. The interaction may utilize one or both of a user device 20 and an SR device 40. Such devices 20, 40 may be telephones, a smart phones, computers, tablets, and other traditional communications devices associated with a person, but may also include devices such as a teller device at a bank facility. In some instances, the user device 20 may be device owned or tightly associated with the user (e.g., smartphone). However, as used herein, and where applicable, a user device 20 may also include in the definition a device that is in temporary use by the user 10, but not owned or associated with the user at a time other than when the user interacts with it. This may include devices such as automated teller machines (ATMs), banking kiosks and other devices from which user data may be collected from. The example described herein considers an interaction between the user 10 and SR 30 as a contiguous interaction, such as a telephone call, chat, or an in-person visit. Although there may be pauses or brief interruptions, the contiguous interaction is generally what is thought of as a single meeting or call and may include discussion of different subjects, with each subject or context being a sub-interaction.

In an ideal world, an SR 30 would be able to perfectly read the user's 10 emotions throughout the interaction and know precisely how to respond in the best way in order to maximize the user's 10 positive emotions and thus help improve the customer relationship. However, for some individuals, it is difficult to properly read the user's 10 emotions. Furthermore, even in the event a user's 10 emotional state is properly identified, it may not be obvious what the best way to respond to that emotional state is. By way of example, in a first use case, if a user 10 places a telephone call to an SR 30 who is a credit card security specialist and a subject of the interaction is the user's stolen credit card while traveling, the SR 30 may be able to properly discern that the user's emotional state is "worried" (negative), but may not realize that an conversation reassuring the user 10 that they should not be concerned about the situation before diving into the details of securing a new credit card. Furthermore, the SR 30 may mis-interpret the user's 10 emotional state as "angry" instead of the more accurate state of "worried", and thus respond in a less than optimal manner.

In various implementations of the system 100 described herein, the system may be able to accurately discern the emotional state of the user 10 and a subject of an interaction, and, based on at least one of historical knowledge, research, or feedback provided by SRs 30, provide a recommended action to the SR 30 for dealing with the user 10 during the interaction. According to one further implementation, recorded information about the interaction may be tagged with EI and stored in a user database where it can be later reviewed for off-line analysis by the SR 30.

Using the above-described first use case with respect to FIG. 1, the user 10 calls, using her smart phone as a user device 20, a credit card security specialist as an SR 30 of the financial institution that issues or manages the credit card. The user 10 may also utilize a browser on her smart phone or on a tablet or PC as a way to connect to the financial institution as well. When the user 10 connects to the system 100, a communications processing engine 110 may initially handle the interaction. Information received from the user may be described as user streaming interaction data (USID). The communications processing engine 110 may initially attempt to determine a subject of the interaction, and a context of the interaction that is related to the subject of the interaction. The context or subject of the interaction may be based on direct user input received directly from the user or indirect user input that is inferred. The direct user input may include selection of a menu choice (e.g., "select 1 if you've lost your credit card"), typed or spoken text (e.g., "I've lost my credit card") or any other mechanism by which the user deliberately indicates a subject. The indirect user input may include an inference from typed or spoken text (e.g., "my wallet was stolen"→subject=lost credit cards), data from an on-line activity context (e.g., the user 10 clicks on a web site link "lost credit cards"), or other form of input in which an inference is to be made regarding the context or subject.

The context or subject of the interaction may be a word or phrase (or, when stored in the computer, a representative token) describing what the interaction (or sub-interaction when an interaction comprises more than one subject) is about. The context of the interaction may include further details relative to the subject of the interaction, and both the subject and the context of the interaction may be determined by the communications processing engine 110.

In the above example, the subject of the interaction is "lost or stolen credit card while traveling". The context of the interaction may include further details relative to the subject of the interaction, such as the user is traveling overseas in Asia when the card was lost/stolen, or the fact that several suspicious transactions have appeared on the card after a point in time that the user 10 reported the card was lost. Additionally, there may not be just a single context or subject of the interaction, but rather a plurality. In such instances, the interaction may be broken into a plurality of sub-interactions, with each having their own context/subject.

The communication processing engine 110 may produce, from the USID and data from the SR 30 or other system elements, recorded information about the interaction in a form of processed stream data 112 that may be stored in an interaction record of a user record in a user database 115. The processed stream data 112 may be in a form of a digitized voice recording, such as an .MP3 file or digitized audio-visual recording, such as an .MP4 file (when a camera is used as part of the user device 20. The processed stream data 112 may be in a form of text, when the communications processing engine 110 employs a speech-to-text converter. Other more abbreviated or more detailed forms of converting and recording information streamed by the user 10 during the interaction may be employed by the communication processing engine 110. For example, only a text-based outline of the interaction may be preserved, or the interaction could be tagged with additional information, like location information, etc. The communications processing engine 110 that utilizes voice recognition may also utilize voice identification in order to maximize the positive emotions of the user 10 by eliminating or minimizing laborious authentication procedures for the initial portions of the interaction.

The processed stream data 112 may also be provided to an emotion tracking engine 120 that creates EI from it. The EI may include, among other things, an emotion type, a strength value, and a certainty value. The emotion type may be an emotion label such as happy, sad, angry, confused, worried, uncertain, calm, etc. The strength value may be a value range reflecting the intensity of the emotion. For example, an angry emotion type may have a strength value of two that implies mildly annoyed to ten that means enraged (on a scale of zero to ten). The certainty value is a representation of the degree of certainty in the emotion type and its strength. For example, a certainty value of 0.9 for anger may mean that the user 10 is almost certainly angry, whereas a certainty value of 0.4 for confused may mean that it is not entirely clear that the user 10 is confused (on a scale of zero to one). The EI may be determined based on attributes from the processed stream data 112 or received directly as inputs from the user device 20. Such attributes may include, e.g., a user's word/language choice, tone of words, accent/tone of words, word inflection, facial feature recognition, physiological characteristics, etc. It could also involve monitoring a user's respiratory rate and heart rate or other vital statistics. Visual data alone may prove adequate, but to the extent that wearables may provide such data, data from the wearables may be employed as well.

By way of illustrative example, a language choice containing expletives is likely to indicate an emotion of anger in the user 10, but perhaps not, since this may simply be a part of the user's 10 normal vocabulary. A raised volume or pitch when compared with the user's 10 normal volume or pitch may be further indicative of an emotion of anger, whereas a detection of rising intonation with an otherwise calm voice might be suggestive of uncertainty. Detection of laughter might be suggestive of happiness or peace. The inflection, intonation, and other voice patterns of various words and phrases may be recorded and taken into account in order to determine the EI.

The emotion tracking engine 120 may not be able to pinpoint an emotion with 100% certainty, but rather may assign a level of certainty to a particular determined emotion. Some emotions may be determined with more certainty than others. For example, anger may be determined with a relatively high degree of certainty if certain factors are detected, whereas confusion may only be determinable with a moderate degree of certainty. Furthermore, it is possible that more than one emotion is active at any particular time. For example, a user may be angry and confused (e.g., their credit card is stolen and they are not being given advice that makes sense to them about how to replace the credit card), or calm and confused (e.g., the user is unsure of which forms they need to fill out upon return from their travel). In one implementation, the emotion tracking engine 120 may be utilized to help determine a user's 10 risk tolerance. Although a user 10 may have indicated a willingness to accept certain investments providing a higher yield, it may turn out, under questioning of an SR 30 that the user is not actually willing to accept high-risk investments. This may be deduced by the emotion tracking engine 120 according to any of the emotional factors described herein, but also in terms of detecting hesitation, reluctance, and other emotions that convey a lack of comfort.

The emotion tracking engine 120 may track the EI throughout the interaction and tag the processed stream data with this EI to produce an EI-tagged interaction record. The tagging may occur at a predefined interval, or when a certain degree of change in the EI is detected, based on a detected change in the context or subject of the interaction, or according to some other criteria. The EI-tagged interaction record may be stored in the interaction record in the user database 115 along with or in place of the processed stream data. The EI-tagged interaction record may be reviewed as an after-action report by the SR 30 after the interaction is complete.

In addition to the EI-tagging including identification of the emotion(s) at a particular point in time and a certainty associated with the emotion(s), an overall EI value (EIV) may be determined which characterizes the user's overall emotional state in terms of a positive or negative scalar value. The determination of the overall EIV may be calculated using a generalized additive model or, more specifically, a weighted factor model. For example, the generalized additive model may take a form of $Y=\alpha+f_1(x_1)+f_2(x_2)+\ldots$, and the weighted factor model may take a form of $Y=\alpha+w_1x_1+w_2x_2\ldots$.

The overall EIV may, for example, range from −10 (extremely negative/bad) to +10 (extremely positive/good), according to a formulation, such as a weighted factor analysis of the emotions, their certainties, and pre-determined weightings that may also take into account the context of the interaction. For example, a user 10 calling about the stolen credit card may be initially determined to be mildly agitated (90% certain) and very confused (50% certain) in a "lost credit card" context. Based on a weighted formulation, at a first time, an overall EIV of −4 may be determined for the interaction after the introductory portion of the call. The SR 30 may communicate reassurance to the user 10 that everything will be alright and provide clear instructions to the user 10 for how to obtain a new credit card by the end of the day. At a second time, an overall EIV of +3 may be determined for the interaction, indicating a positive effect on the emotions of the user 10 between the first and second time.

Figure 2:
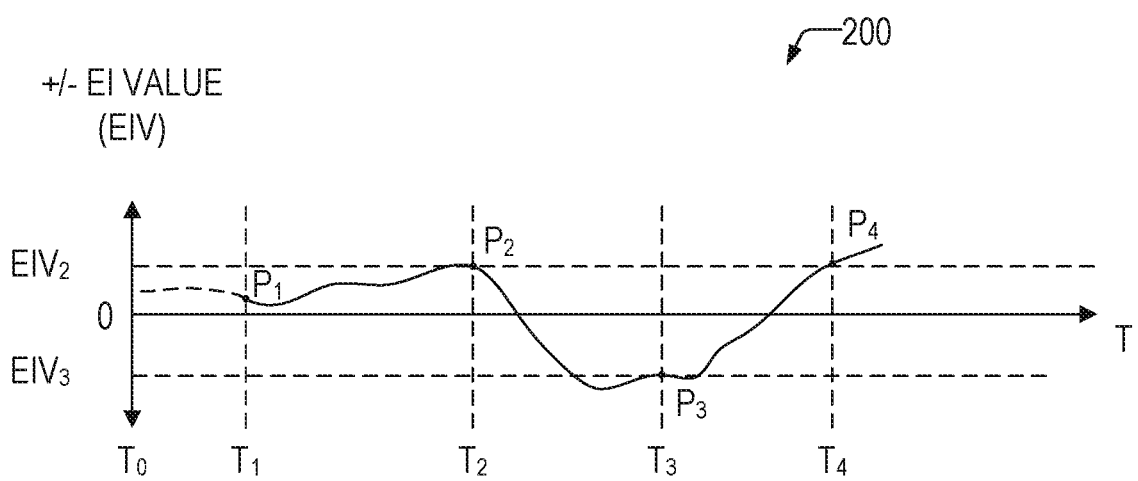
FIG. 2 is a timing diagram that illustrates an example EIV varying over time in an interaction.

Turning briefly to FIG. 2, which is a timing diagram 200 showing a changing EIV over the course of an interaction, a user 10 may contact an SR 30 at time $T_0$. Initially, the emotion tracking engine may not have enough streamed data to make a determination of an overall EIV. However, after some period of time $T_1$, the emotion tracking engine 120 is able to make an initial assessment of the user's 10 emotional state and arrive at overall EIV at point P1. As can be seen in FIG. 2, the interaction generally starts out with a positive EIV, suggesting that the subject of the interaction is resulting in a positive user experience between a time $T_1$ and time $T_2$ during which the overall EIV is positive and increasing. By way of example, this may be a time when the user 10 is talking with his advisor (the SR 30) about some nice retirement communities under consideration. Since the user 10 is happy with what he has reviewed thus far, his word choices, voice tone, and content (and possibly facial features if video is used) is interpreted by the emotion tracking engine 120 to determine the positive overall EIV between the times $T_1$ and $T_2$. No action need be taken during this time period since the overall EIV is positive and trending upwards (although it is possible if the strategy engine 130, discussed in more detail below, is able to discern an even better response under these circumstances, that a recommended action be communicated to the SR 30).

However, at $P_2$ (time $T_2$), the SR 30 begins a discussion about adequate life insurance during a next sub-interaction. Since this discussion causes the user 10 to focus on his death and the implications it might have on his family (and, perhaps, because the SR 30 does not initially raise the topic in a very effective way), the overall EIV at time $T_2$, which is $EIV_2$, begins to fall. As before this value may be based on word choices, voice tone, content, facial features, etc. The discussion of adequate life insurance continues to time $T_3$, during which time the overall EIV crosses the zero threshold from positive to negative and continues decreasing to a value at $P_3$ to $EIV_3$. The strategy engine 130 may detect this decline and negative value $EIV_3$ at $T_3$ and conduct a search, triggered by at least one of the decline or negative value, in a strategy database 135 that may comprise a strategy for dealing with such a decline in the overall EIV. This search may be more effective or refined when it includes information of the context of the (current) interaction or sub-interaction.

In the example presented, the context of the interaction is based on the subject of the interaction which is adequate life insurance. The strategy engine 130 may utilize information obtained from the communication processing engine 110 about words and concepts communicated from both the user 10 and the SR 30 and obtain a potential recommended action to present to the SR 30 in dealing with the EIV decline or low value. The strategies stored in the strategy database 135 may be obtained from research or from historical records from the historical database 125 about strategies that have worked (or worked better) in the past with other users or, if available, with the current user 10. The communication of the recommended action to the SR 30 may occur in the form of, for example, a pop-up screen on the SR device 40, or in any other form that the SR 30 may be able to integrate, in real time, in his interaction with the user 10.

In some situations, the strategy engine 130 may not be able to fully communicate the recommended action in real-time to the SR 30. For example, if the SR 30 is playing a round of golf with the user 10, the SR 30 may not be able to constantly check the display of his device 40. In this situation, it may simply be sufficient to alert the SR 30 of the declining or negative overall EIV so that the SR 30 becomes aware that a present strategy or discussion topic should continue and attempt something else (the SR 30 may then, post interaction, review the EI-tagged interaction record and communicate a recommended action later).

In one scenario, an indication of an overall EIV of the user 10 may be provided in a discrete manner to the SR 30 in real time. For example, if augmented reality (AR) glasses are being worn, then some feature of the display, such as a color halo or an icon associated with the user 10 may change color or shape to distinguish between a positive or inclining overall EIV and a negative or declining overall EIV. Or, the alert may be tactile, such as providing a vibrating signal when a negative or declining EIV is determined, or it may be provided by an earpiece by way of an audio message. In this way, the user 10 may not know that the SR 30 is receiving this type of feedback about the user's 10 current emotional state. When the SR 30 is in his office in front of a computer display interacting with the SR 30 either remotely or in person, it may be possible to communicate a recommendation to the SR 30 in a discrete manner as well. It may also be possible for a recording device to record audio or other information during the interaction, and then the data from the recording device be later downloaded for subsequent analysis after the interaction is complete.

Illustrating this with the use case described above, the SR 30 initiates the adequate life insurance discussion at $T_2$ and notes that the user's overall EIV is declining or has reached some threshold value. The strategy engine 130 notes this as well, and in response, utilizes the communication processing engine 110 to analyze the words and phrases used by the SR 30. It determines that the SR 30 is choosing words that focus primarily on the user's 10 bank accounts and their adequacy when discussing life insurance. The strategy engine 130 searches the strategy database 135 with a subject of the interaction being adequate life insurance, and finds a strategy recommendation that language focused on financial security for loved ones tends to generate a better emotional response than language focused on adequacy of bank accounts. Such a strategy recommendation had been determined based on an analysis of language used in similar previous discussions about adequacy of life insurance (possibly at least in part from the user database 115 and the historical database 125). The strategy engine 130 may then pop of a message box as a communicated recommended action to the SR 30, stating, "avoid language that focuses on bank accounts, but instead focuses on financial security for family members".

In FIG. 2, the time interval between $T_3$ and $T_4$ shows a steady increase of the overall EIV into positive territory, and by time $T_4$, the overall EIV is at the highest value $EIV_2$ reached during the interaction. The time interval between $T_3$ and $T_4$ could be the same sub-interval in which the discussion of adequate life insurance is continued, but in which case the SR 30 incorporates the communicated recommended action and the user 10 responds positively to it. The time interval between $T_3$ and $T_4$ could be a different sub-interval in which the context of the interaction is changed to a more favorable topic, which may be done intentionally either by the SR 30 or the user 10.

Once the interaction is complete, the strategy engine 130 may assess the success (or lack thereof) of the interaction and incorporate that information (e.g., the strategy used by the SR 30 and its impact on the overall EIV of the user 10) into at least one of the strategy database 135 or the historical database 125. Using the above use case, the strategy engine 130 may associate words, phrases, volume, intonation, etc., used by the SR 30 between times $T_2$ and $T_3$ with a negative overall EIV impact, and those used by the SR 30 between times $T_3$ and $T_4$ with a positive overall EIV impact so that this data may be utilized during future interactions.

Although FIG. 2 is presented above as an illustrative aid for discussion herein, it is also possible that such a timing diagram is provided on the display of the SR device 40 for review by the SR 30 in an after-action review, e.g., after the interaction is complete. In this implementation, the SR 30 may move a pointing device, such as a mouse arrow, over a particular region of the graph, for example, time $T_3$, and a detailed analysis of what was occurring at that time may be presented to the SR 30. This may include the specific EIV value at a point in time, the context information or subject information at that point in time, a summary of language being used (or text of the actual language being used), and potential recommended actions to improve the EIV at that point in time. The strategy engine 130 may, in the after-action review, provide advanced analysis relating the highlighted point to other similar points of past interactions for this user 10 or other users/groups of users. The groups may be according to the SR 30, user characteristics, user demographics, or any other attribute of interest. A time period, e.g., $T_2$ to $T_3$ may be selected as well so that a range of time may be considered in this manner as well.

In one implementation, the SR 30 may provide some assistance to the emotion tracking engine 120 in terms of identifying a particular emotion of the user 10. For example, if, during the interaction, the SR 30 thinks the user 10 may be getting agitated, the SR 30 could provide some input to the system "user appears agitated". The emotion tracking engine 120 may apply as little or as much weight to such SR 30 assistance as deemed appropriate, and when the emotion tracking engine's 120 determination of emotion reflects a highly likely emotion that differs substantively from that provided by the SR 30, the SR 30 may override (or apply a very low weight to) the SR's 30 input.

Other forms of larger scale (macro) analyses may be performed by the strategy engine 130 based on aggregations of data. For example, the strategy engine 130 may analyze all of the interactions for a particular SR 30 to create a customer experience index (CEI). The CEI may, in one implementation, be a summation or integration of the EIV for all of the SR 30 interactions, or it may be an average EIV value. Using such a CEI may permit a performance assessment or ranking to be made of the SR 30 in terms of the types of positive or negative emotions the SR 30 tends to evoke in users 10. This is but one of many possible ways of determining a CEI or applying its use. The calculation of the CEI may be determined based on certain time spans, such as interactions in the past three months. By calculating the CEI over different time periods, it may be determined whether an SR 30 is improving over time, or it may allow assessment of various training programs and the like. The calculation of the CEI may also be performed based on a context of the interaction, so that, for example, an assessment may be made as to whether additional training is needed with respect to, e.g., discussions of life insurance. The calculation of the CEI may be performed based on different groups of SRs 30. For example, a CEI for all bank tellers or all financial advisors could be determined separately in order for the service provider to determine where to focus training efforts. The calculation of the CEI may be performed based on different regions of the business entity, for example, West Coast vs. East Coast regions. Any of the factors discussed and stored in the user database 115, the historical database 125, or the strategy database 135 may be utilized as a criterion for calculating a particular CEI to perform various metric assessments for the service provider.

The strategy engine 130 may identify other prior interactions of the user 10 stored in the user database 115 that may be of importance in the present interaction. By way of example, a user 10 may attempt to make a cash withdrawal from an ATM, but due to mis-entry of her personal identification number (PIN), may be denied access. The emotion tracking engine 120 may detect an anger emotion during the interaction between the user 10 and the ATM and record this interaction information in an interaction record, tagging it with the EI. When the user 10 approaches a bank teller as an SR 30 to make the withdrawal, the bank teller may be alerted, near the beginning of the interaction, to the fact that the user 10 just had an unpleasant experience at the ATM in the context of an attempted cash withdrawal, and thus may be in need of additional efforts to attempt to raise their overall EIV. In another implementation, the negative interaction with the ATM may cause the strategy engine 130 to alert the user's 10 account manager (SR 30) to contact the user 10 and address the situation causing the negative emotions. This could apply to negative interactions involving rejected credit cards or other types of interactions likely to produce negative emotions in users 10 of the system 100.

In one implementation, a virtual or augmented reality engine 140 may be provided to enhance the interaction experience between the user 10 and the SR 30. As mentioned previously, an indication of the EIV may be provided on the SR device 40, and this may be done via, e.g., the virtual/augmented reality engine 140 by displaying a symbol, aura, or other display indicator on the display that also shows an image or representation of the user 10.

In addition, however, the virtual/augmented reality engine 140 may be utilized to convey features to the user 10 that may be more likely to elicit a positive emotional reaction. By way of example, an older very wealthy user 10 may be impressed by an impressive traditional office. In this case, the virtual/augmented reality engine 140 may be utilized to create a backdrop of a large dark wooden paneled office with art on the walls and statues on tables, along with high-end furniture. On the other hand, a younger technology entrepreneur user 10 may be more impressed with a sparse but high-tech functional office. In this case, the virtual/augmented reality engine 140 may be utilized to create a backdrop of an uncluttered office with multiple computer displays and computer paraphernalia connected to them. Any feature that the virtual/augmented reality engine 140 is capable of generating and that may create a positive emotional response in the user may be manipulated. For example, if a particular user 10 (or users collectively) favors the color blue, then the engine 140 may incorporate more blue-colored objects in the background. Or, it may turn out that background objects create distraction, and thus the engine 140 may remove objects to eliminate the distractions. The determination that a particular user or collective group of users collectively does not have to be overtly provided by the user(s) 10. The virtual/augmented reality engine 140 may determine various user 10 preferences that evoke a positive emotional response using, e.g., adaptive learning AI strategies and adapting the preferences over time. Such strategies may be specific to individual users, collective groups of users, interaction contexts, type of SR 30, and the like.

The above system 100 may be employed in a variety of scenarios likely to create negative user 10 experiences that may be remedied by an SR 30. For example, a user 10 has their credit card stolen while they are traveling and they do not have much information about who to contact because they are traveling. The user 10 calls a help desk, and may interact with an automated system or an actual person as the SR 30. Based on a limited interaction, the communication processing engine 110 determines the identity of the caller based on voice identification software associated with the communication processing engine 110, thus minimizing authentication procedures and minimizing additional negative emotion on the part of the user 10. The communication processing engine 110 may now associate relevant information with the user identification and ask the user 10 to provide the subject of the interaction or other information relevant to the context of the interaction. The user 10 responds that they lost their credit card. The system 100 knows that they have three different credit cards, so it asks which of the three cards was lost, possibly by providing selectable options that permit the user to easily pick one.

The help desk is able to reassure the user 10 that everything is taken care of, that they will not be responsible for fraudulent charges, and that they will be issued a new card promptly. The user thanks the help desk, indicates his complete agreement with the proposed solution and indicates relieve before ending the call. In this situation, since the interaction generally had an overall EIV, the system 100 may record this information in the interaction record of the user 10 in the user database 115, and determine that no further action is needed.

In an alternate scenario, the user 10 starts getting the runaround, and things do not go well in the call with the help desk. Here, the emotional tracking engine 120 detects this downhill trend of the user's 10 EIV, and that may set up a flag or an automated message to that user's 10 financial advisor alerting them to the fact that the user's 10, helpdesk interaction went very poorly. This may trigger the advisor to contact the user for a subsequent interaction.

The devices 20, 40 may also incorporate some or all of the features described as machines 400 (FIG. 4) below, and the system 100 may also incorporate some or all of the features described as a system 500 (FIG. 5) below.

Figure 3:
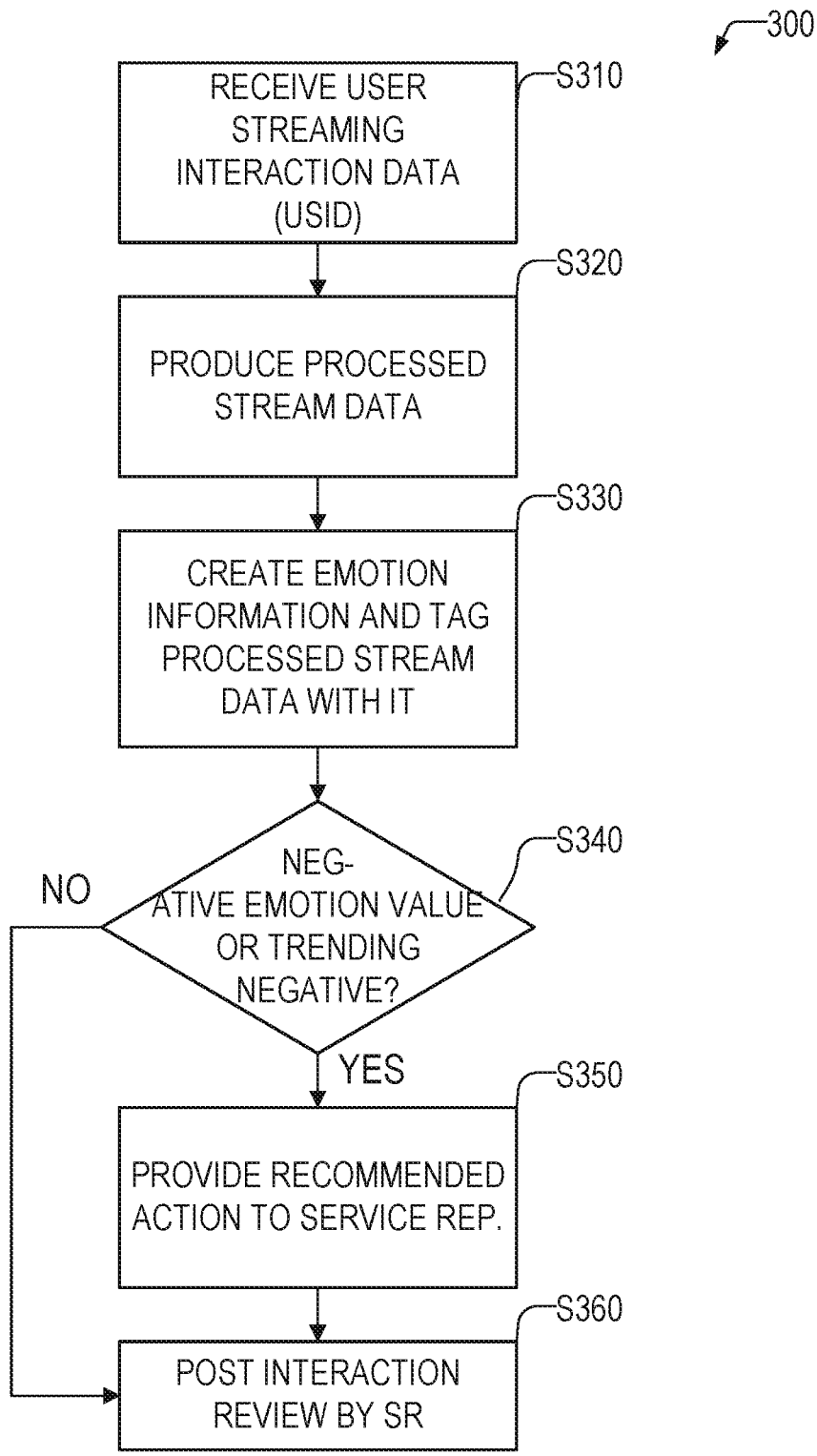
FIG. 3 is a flowchart that illustrates an example process that may be utilized by the emotional intelligence assistant.

FIG. 3 is a flowchart of a process 300 that may implement aspects of the system 100 described above. In operation S310, the system 100 may receive the USID from the user 10. The USID may be in a form of voice, text, video, user interface interaction data, or other communication data form. In operation S320, this USID, along with possibly interaction data from the SR 30 or other system components (e.g., ATMs, system bots or automated communications elements of the system 100, or other system components) may be converted, by the communication processing engine 110 into processed stream data that may be suitable for storing in a system memory for later retrieval and analysis.

In operation S330, the emotion tracking engine 120 creates EI from the USID or processed stream data, such as text, voice characteristics, works, phrases, intonation, volume, facial features, and the like. The processed data stream may be tagged with the EI in a real-time manner. An overall EIV, as described above, may be produced from the EI and also used to tag the processed data stream. An indicator representing the overall EIV at the current time may be presented to the SR 30. The indicator may be an aura about the user 10 that, e.g., changes color. The indicator may be some form of changing icon, or sensed tactile device.

If the emotion tracking engine 120 detects a negative EIV or an EIV trending negative (S340:YES), it may, in operation S350, access the strategy engine 130 that may be used to access the strategy database 135 to locate and communicate a recommended action to the SR 30 that may help improve the EIV. Otherwise (S340:NO), it may skip operation S350 and proceed to operation S360. In operation S360, the saved processed data stream with tagged IE information may be accessed by the SR 30 for a post-interaction review that may not have been possible in real time as the interaction was occurring.

General Computer and Network Architecture

Figure 4:
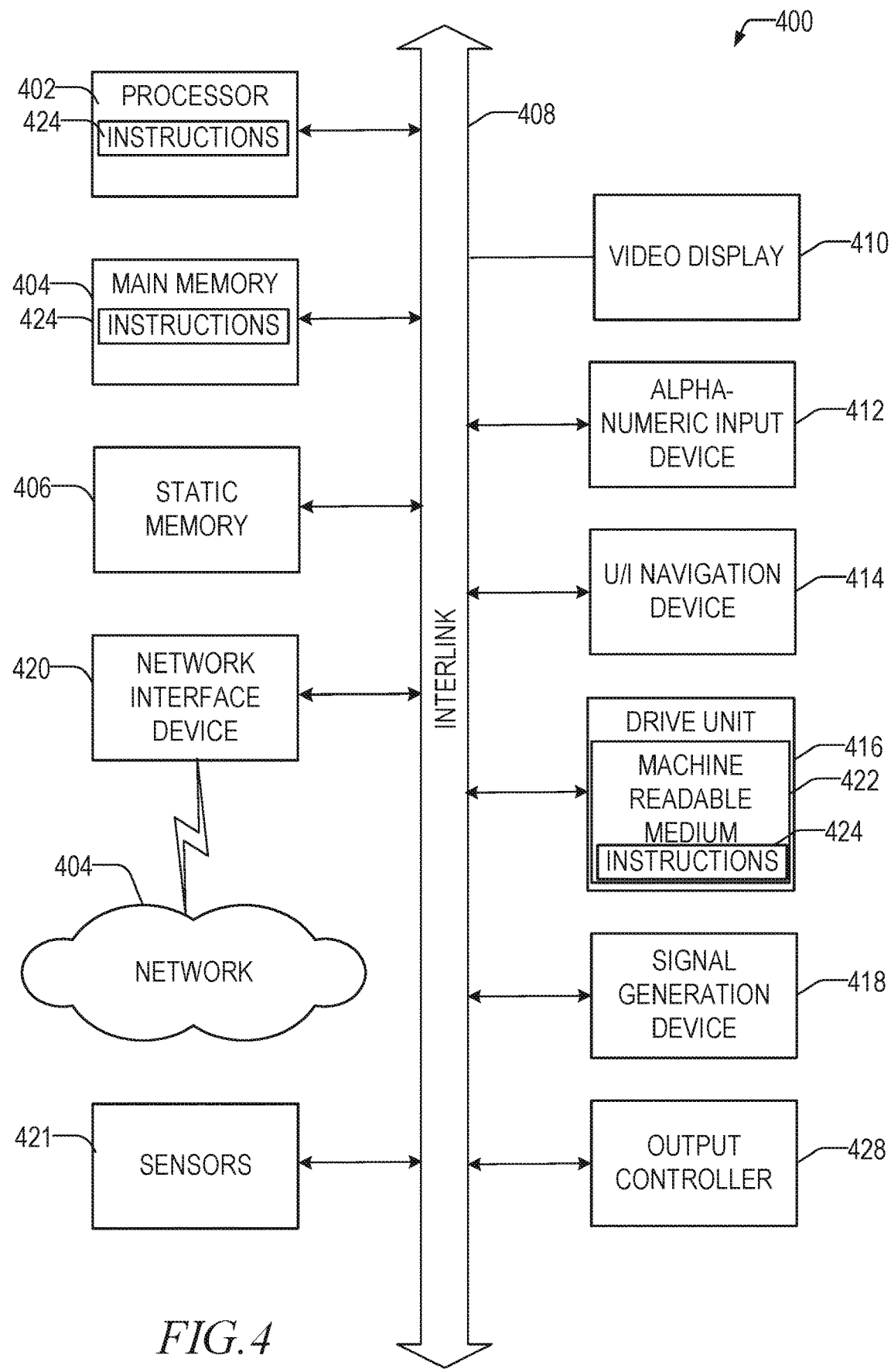
FIG. 4 is a block diagram illustrating an example machine that may be a computer on which various processes described herein may be performed.

To describe some configurations in greater detail, reference is made to examples of hardware structures and interconnections usable in the designs of the present disclosure. FIG. 4 is a block diagram illustrating a machine that may be a computer on which various processes described herein may be performed. The machine (e.g., computer) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example described herein, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB)), parallel, or other wired or wireless (e.g., infrared (IR), near field communication (NFC), etc.) controller connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 424 may further be transmitted or received over the communications network 405 using a transmission medium via the network interface device 420. The term "transmission medium" is defined herein to include any medium that is capable of storing, encoding, or carrying instructions for execution by the machine, and includes digital or analog communications signals or other medium to facilitate communication of such software.

The machine 400 may communicate with one or more other machines 400 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN), or any other way of transferring data between machines 400. In an example, the network interface device 420 may include one or more physical jacks (e.g., Ethernet, coaxial, or phone jacks) or one or more antennas to connect to the communications network 426.

In an example, the network interface device 420 may include a plurality of antennas to wirelessly communicate using at least one of single-input multiple-output (SIMO), multiple-input multiple-output (MIMO), or multiple-input single-output (MISO) techniques. In some examples, the network interface device 420 may wirelessly communicate using Multiple User MIMO techniques.

A wide variety of computing devices may constitute a machine 400, as described herein. The following list includes a variety of devices that may fit the definition of a machine 400: a personal data assistant (PDA), a cellular telephone, including a smartphone, a tablet computing device, a laptop computer, a desktop computer, a workstation, a server computer, a mainframe computer, and the like.

Figure 5:
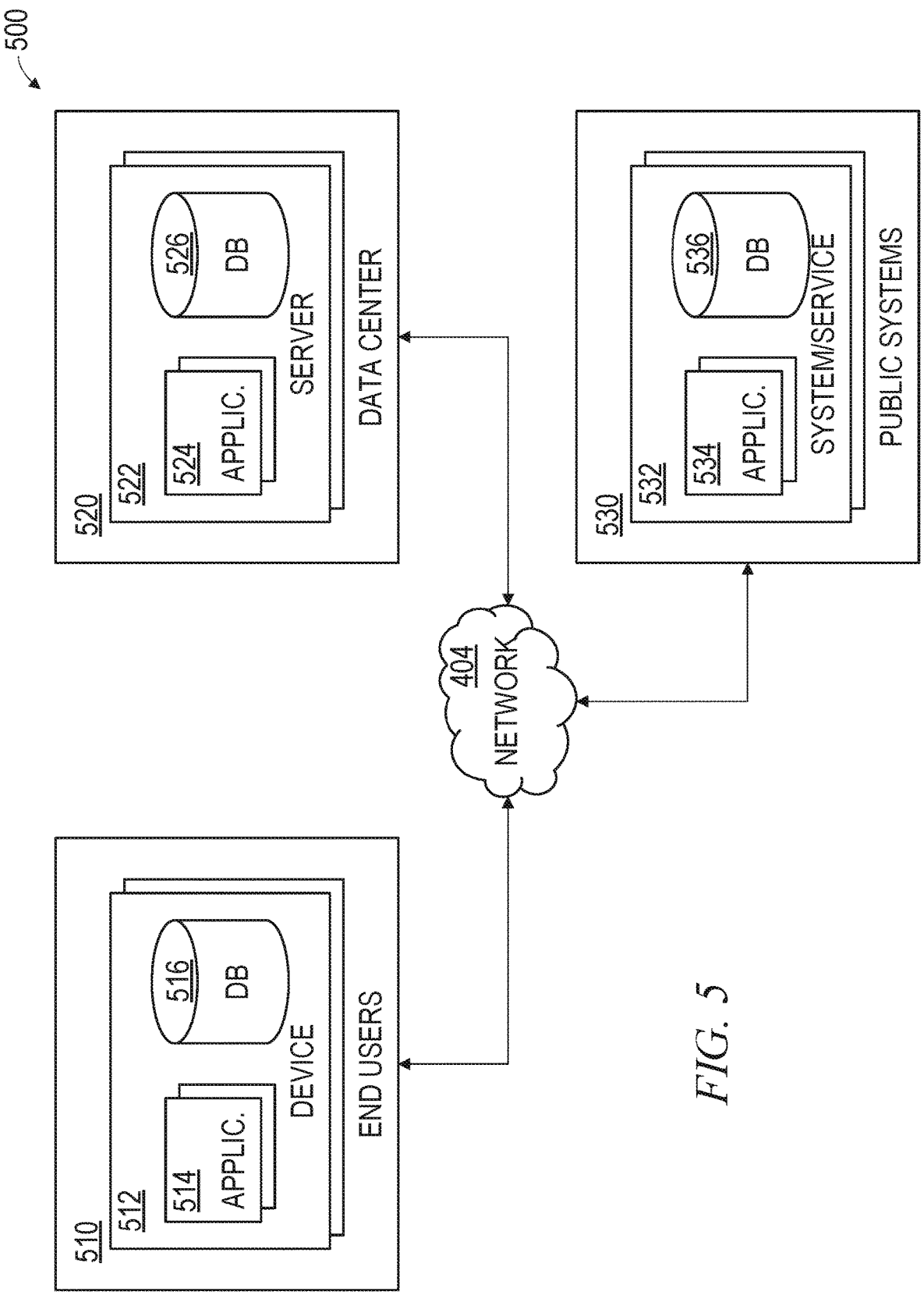
FIG. 5 is a block diagram of an example distributed computing system.

FIG. 5 is a block diagram of a distributed system 500 that may include a client-server architecture or cloud computing system. Distributed system 500 may have one or more end users 510. An end user 510 may have various computing devices 512, which may be machines 400 as described above. The end-user computing devices 512 may comprise applications 514 that are either designed to execute in a stand-alone manner, or interact with other applications 514 located on the device 512 or accessible via the network 405. These devices 512 may also comprise a data store 516 that holds data locally, the data being potentially accessible by the local applications 514 or by remote applications.

The system 500 may also include one or more data centers 520. A data center 520 may be a server 522 or the like associated with a business entity that an end user 510 may interact with. The business entity may be a computer service provider, as may be the case for a cloud services provider, or it may be a consumer product or service provider, such as a retailer. The data center 520 may comprise one or more applications 524 and databases 526 that are designed to interface with the applications 514 and databases 516 of end-user devices 512. Data centers 520 may represent facilities in different geographic locations where the servers 522 may be located. Each of the servers 522 may be in the form of a machine(s) 400.

The system 500 may also include publicly available systems 530 that comprise various systems or services 532, including applications 534 and their respective databases 536. Such applications 534 may include news and other information feeds, search engines, social media applications, and the like. The systems or services 532 may be provided as comprising a machine(s) 400.

The end-user devices 512, data center servers 522, and public systems or services 532 may be configured to connect with each other via the network 305, and access to the network by machines may be made via a common connection point or different connection points, e.g. a wireless connection point and a wired connection. Any combination of common or different connections points may be present, and any combination of wired and wireless connection points may be present as well. The network 305, end users 510, data centers 520, and public systems 530 may include network hardware such as routers, switches, load balancers and/or other network devices.

Other implementations of the system 500 are also possible. For example, devices other than the client devices 512 and servers 522 shown may be included in the system 500. In an implementation, one or more additional servers may operate as a cloud infrastructure control, from which servers and/or clients of the cloud infrastructure are monitored, controlled and/or configured. For example, some or all of the techniques described herein may operate on these cloud infrastructure control servers. Alternatively, or in addition, some or all of the techniques described herein may operate on the servers 522.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products.

Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like. The code may also be intangibly stored on one or more non-transitory and non-volatile computer readable media, such as those described above. In these cases, instructions resident on the media are read and executed by a processor to perform various functions.

The above description is intended to be illustrative, and not restrictive. For example, the above-described examples (or one or more aspects/configurations thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it should not be used to interpret or limit the scope or meaning of the claims.

Also, in the above Detailed Description, various features may be grouped together to streamline the disclosure. However, the claims cannot set forth every feature disclosed herein, as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the claims, along with the full scope of equivalents to which such claims are entitled.

The invention claimed is:

1. A computer-implemented method for operating an emotional intelligence assistant of a service provider system, the method comprising:
   using a hardware processor to perform the operations comprising:
   during a person-to-person interaction between a user and a service representative:
      receiving user streaming interaction data (USID);
      determining a context of an interaction between a user and a service representative that is related to a subject of the interaction;
      processing the USID by a communication processing engine to produce processed stream data that is stored in an interaction record in a user database;
      creating emotion information (EI) by analyzing, with an emotion tracking engine, the processed stream data and data from physiological sensors of wearable devices of the user, and associating the EI with the processed stream data to produce and store an EI-tagged interaction record, wherein the EI comprises first EI that includes an overall first EI value (EIV) that reflects a positive-negative scale value of the first EI, the first EI being related to first USID captured at a first time, and second EI that includes an overall second EIV that reflects a positive-negative scale value of the second EI, the second EI being related to second USID captured at a second time that is later than the first time, wherein the overall second EIV is different from the overall first EIV, the first and second EIV characterizing the user's overall emotional state in terms of a positive or negative scalar value during the person-to-person interaction;
      determining that the second EIV is more negative than the first EIV;
      responsive to determining that the second EIV is more negative than the first EIV:
         changing a halo associated with the user, the halo displayed within an augmented reality display of a device of the service representative, the halo changed to indicate a declining overall EIV; and
         providing a recommended action, retrieved from a strategy database, to the service representative within the augmented reality display that is dependent upon on the context of the interaction and the EI, the recommended action comprising one or more words or phrases that the service representative is to avoid; and
   after the person-to-person interaction has completed, displaying an interactive graphical display to the service representative showing a timing diagram illustrating a change in the EIV over the course of the person-to-person interaction, the timing diagram configured to display, when the service representative positions a pointing device, over a particular region of the diagram, a specific EIV at that point in time, text of actual language uttered at that point in time, and suggested recommended actions to improve the EIV at that point in time.

2. The method of claim 1, wherein the creating of the EI comprises additionally analyzing at least one of a user's word choice, tone of words, word inflection, facial feature recognition, or physiological characteristics.

3. The method of claim 1, wherein the USID comprises voice and video data.

4. The method of claim 1, wherein the first EI and the second EI each comprise an emotion type, a strength value, and a certainty value.

5. The method of claim 1, further comprising determining the subject of the interaction from direct user input received directly from the user or indirect user input that is inferred indirectly from language, text, location, on-line access information, or other information received from the user.

6. The method of claim 5, wherein the direct user input is at least one of a menu choice, a typed word or phrase, or a spoken word or phrase.

7. The method of claim 5, wherein the indirect user input is at least one of: a typed word or phrase; a spoken word or phrase that differs from an actual subject of the interaction; or data from an on-line activity context.

8. The method of claim 1, wherein the interaction comprises a plurality of sub-interactions, each sub-interaction comprising its own context of the interaction and subject of the interaction.

9. The method of claim 1, further comprising:
   updating the strategy database based on the EI-tagged interaction record.

10. The method of claim 1, further comprising calculating the overall first EIV and the overall second EIV using a generalized additive model or a weighted factor model.

11. A system comprising:
   a hardware processor;
   a memory device communicatively coupled to the hardware processor and storing instructions for operating an emotional intelligence assistant of a service provider system, the instructions, which when executed by the hardware processor, cause the system to perform operations comprising:
   during a person-to-person interaction between a user and a service representative:
      receiving user streaming interaction data (USID);
      determining a context of an interaction between a user and a service representative that is related to a subject of the interaction;
      processing the USID by a communication processing engine to produce processed stream data that is stored in an interaction record in a user database;
      creating emotion information (EI) by analyzing, with an emotion tracking engine, the processed stream data and data from physiological sensors of wearable devices of the user, and associate the EI with the processed stream data to produce and store an EI-tagged interaction record, wherein the EI comprises first EI that includes an overall first EI value (EIV) that reflects a positive-negative scale value of the first EI, the first EI being related to first USID captured at a first time, and second EI that includes an overall second EIV that reflects a positive-negative scale value of the second EI, the second EI being related to second USID captured at a second time that is later than the first time, wherein the overall second EIV is different from the overall first EIV, the first and second EIV characterizing the user's overall emotional state in terms of a positive or negative scalar value during the person-to-person interaction;
      determining that the second EIV is more negative than the first EIV;
      responsive to determining that the second EIV is more negative than the first EIV;
         changing a halo associated with the user, the halo displayed within an augmented reality display of a device of the service representative, the halo changed to indicate a declining overall EIV; and communicating a recommended action, retrieved from a strategy database, to the service representative that is dependent upon on the context of the interaction and the EI, the recommended action comprising one or more words or phrases that the service representative is to avoid; and after the person-to-person interaction has completed, displaying an interactive graphical display to the service representative showing a timing diagram illustrating a change in the EIV over the course of the person-to-person interaction, the timing diagram configured to display, when the service representative positions a pointing device, over a particular region of the diagram, a specific EIV at that point in time, text of actual language uttered at that point in time, and suggested recommended actions to improve the EIV at that point in time.

12. The system of claim 11, wherein creating of the EI comprises additionally analyzing at least one of a user's word choice, tone of words, word inflection, facial feature recognition, or physiological characteristics.

13. The system of claim 11, wherein the first EI and the second EI each comprise an emotion type, a strength value, and a certainty value.

14. The system of claim 11, wherein the processor is further configured to determine the subject of the interaction from direct user input received directly from the user or indirect user input that is inferred indirectly from language, text, location, on-line access information, or other information received from the user.

15. The system of claim 11, wherein the processor is further configured to update the strategy database based on the EI-tagged interaction record.

16. A non-transitory computer-readable storage medium, the computer-readable storage medium storing instructions for operating an emotional intelligence assistant of a service provider system, the instructions, when executed by a machine, cause the machine to perform operations comprising:

during a person-to-person interaction between a user and a service representative:
receiving user streaming interaction data (USID);
determining a context of an interaction between a user and a service representative that is related to a subject of the interaction;
processing the USID by a communication processing engine to produce processed stream data that is stored in an interaction record in a user database;
creating emotion information (EI) by analyzing, with an emotion tracking engine, the processed stream data and data from physiological sensors of wearable devices of the user, and associating the EI with the processed stream data to produce and store an EI-tagged interaction record; wherein the EI comprises first EI that includes an overall first EI value (EIV) that reflects a positive-negative scale value of the first EI, the first EI being related to first USID captured at a first time, and second EI that includes an overall second EIV that reflects a positive-negative scale value of the second EI, the second EI being related to second USID captured at a second time that is later than the first time, wherein the overall second EIV is different from the overall first EIV, the first and second EIV characterizing the user's overall emotional state in terms of a positive or negative scalar value during the person-to-person interaction;
determine that the second EIV is more negative than the first EIV;
responsive to a determination that the second EIV is more negative than the first EIV:
changing a halo associated with the user, the halo displayed within an augmented reality display of a device of the service representative, the halo changed to indicate a declining overall EIV; and
providing a recommended action, retrieved from a strategy database, to the service representative within the augmented reality display that is dependent upon on the context of the interaction and the EI, the recommended action comprising one or more words or phrases that the service representative is to avoid; and
after the person-to-person interaction has completed, displaying an interactive graphical display to the service representative showing a timing diagram illustrating a change in the EIV over the course of the person-to-person interaction, the timing diagram configured to display, when the service representative positions a pointing device, over a particular region of the diagram, a specific EIV at that point in time, text of actual language uttered at that point in time, and suggested recommended actions to improve the EIV at that point in time.

* * * * *